(12) United States Patent
Chia et al.

(10) Patent No.: US 7,594,058 B2
(45) Date of Patent: Sep. 22, 2009

(54) CHIPSET SUPPORTING A PERIPHERAL COMPONENT INTERCONNECTION EXPRESS (PCI-E) ARCHITECTURE

(75) Inventors: Peter Chia, Hsin Tien (TW); Chad Tsai, Hsin Tien (TW); Jiin Lai, Hsin Tien (TW); Edward Su, Hsin Tien (TW); Chih-Kuo Kao, Hsin Tien (TW)

(73) Assignee: Via Technologies, Inc., Taipei Hsien (TW)

( * ) Notice: Subject to any disclaimer, the term of this patent is extended or adjusted under 35 U.S.C. 154(b) by 84 days.

(21) Appl. No.: 11/267,498

(22) Filed: Nov. 7, 2005

(65) Prior Publication Data

US 2007/0106826 A1    May 10, 2007

(51) Int. Cl.
G06F 13/36    (2006.01)
(52) U.S. Cl. .................. 710/309; 710/242; 710/306
(58) Field of Classification Search ............. 710/315, 710/108, 113, 119, 200, 241, 242, 306, 312
See application file for complete search history.

(56) References Cited

U.S. PATENT DOCUMENTS

| | | | | |
|---|---|---|---|---|
| 4,903,196 | A * | 2/1990 | Pomerene et al. | 712/217 |
| 5,323,403 | A * | 6/1994 | Elliott | 714/757 |
| 5,485,559 | A * | 1/1996 | Sakaibara et al. | 345/505 |
| 5,638,531 | A * | 6/1997 | Crump et al. | 711/123 |
| 6,157,393 | A * | 12/2000 | Potter et al. | 345/505 |
| 7,249,358 | B2 * | 7/2007 | Emma et al. | 718/105 |
| 2005/0273400 | A1 * | 12/2005 | Blankenship et al. | 705/28 |
| 2006/0050645 | A1 * | 3/2006 | Chappell et al. | 370/252 |
| 2006/0206655 | A1 * | 9/2006 | Chappell et al. | 710/315 |
| 2007/0067551 | A1 * | 3/2007 | Ikeda et al. | 710/315 |
| 2007/0070886 | A1 * | 3/2007 | Zirin | 370/225 |

OTHER PUBLICATIONS

Texas Instruments. XIO200A/XIO200AI PCI Express to PCI Bus Translation Bridge. Data Manual. Apr. 2007.*
PCI-SIG. PCI Express Base Specification. Revision 1.0. Apr. 29, 2002.*
Quinnell, Richard. Getting aboard the PCI Express. EE Times-India. Sep. 2006.*
Integrated Device Technology, Inc. 24-Lane 3-Port Non-Transparent PCI Express Switch. 89PES24N3 Product Brief. Feb. 28, 2005.*

* cited by examiner

*Primary Examiner*—Mark Rinehart
*Assistant Examiner*—Matthew D Spittle
(74) *Attorney, Agent, or Firm*—Birch, Stewart, Kolasch & Birch, LLP

(57) ABSTRACT

The present computing system using PCI-E architecture includes at least one first PCI-E port, a first port-arbiter, a first URD logic, a microprocessor, a DARD logic and a device arbiter. The first port-arbiter receives a data from the first PCI-E port. The first URD logic is coupled to said first port-arbiter. The first URD logic includes an onboard range table and a PCI-E device range table for detecting the data of onboard access or peer-to-peer access. The microprocessor receives and processes the data from the first URD logic for said onboard access. The DARD logic receives the data from the microprocessor. The DARD logic decodes a device range of a downstream request of the data. The device arbiter is coupled to the DARD logic and the first URD logic for dispatching the data to one of the first PCI-E port.

10 Claims, 4 Drawing Sheets

CHIPSET SUPPORTING A PERIPHERAL COMPONENT INTERCONNECTION EXPRESS (PCI-E) ARCHITECTURE

BACKGROUND OF THE INVENTION (1) Field of the Invention

The present invention relates in general to the field of computers, and more particularly to a computing system and a method for fast accessing the peer-to-peer cycles in Peripheral Component Interconnection Express (PCI-Express).

(2) Description of the Prior Art

A computer, or a computing system, is a type of data processing system. Examples of the computer include a server, a workstation, a desktop computer, a notebook computer, a laptop computer, and a hand-held device. Typically, a computer system includes of a microprocessor and memory.

The computing system may also include peripheral devices, such as a keyboard, a mouse and disk drives that connect to the computer via input/output (I/O) ports. The I/O ports allow the peripheral devices to communicate with the processor through a bus such as peripheral component interconnection (PCI) bus. In general, the bus can be either a parallel or a serial interface for connecting the peripheral devices to the computer system.

As consumers demand faster data processing speed and performance, some innovative devices have exceeded the capabilities of current bus architectures such as the conventional PCI bus. The innovative devices include high performance graphics cards, high speed memory, high speed microprocessors, high bandwidth networking, and other high speed devices. These innovative devices have created a need for a high performance and greater bandwidth interconnections. In order to meet this need, a new interconnection architecture, commonly referred to as PCI Express (or PCI-E) architecture, has been developed to provide the high speed interconnection and peer-to-peer access capability.

PCI-Express is a general purpose input/output (I/O) serial interconnection that provides a high performance interconnection for attaching devices such as high performance graphic cards, universal serial bus (USB) ports, networking and other such devices. Because the PCI Express architecture may connect to several different types of devices, the architecture provides a standard for communications in order to consolidate these devices on a single interconnection.

FIG. 1 is a block diagram of a prior computing system 10 employing the PCI-Express architecture. The computing system 10 includes a microprocessor 12, a chipset 14 and a plurality of PCI-E ports 16. The chipset 14 includes a port arbiter 141 and a Downstream Address Range Decoding logic (DARD logic for short) 143. No matter "onboard access" or "peer-to-peer access" of the prior art on FIG. 1, the upstream requests from the PCI-E ports 16 are sent to microprocessor 12. Said "onboard access" means an access is processed by the microprocessor 12; and said "peer-to-peer access" means an access between two PCI-E ports 16, which needs no process from microprocessor 12.

The peer-to-peer access doesn't need any process directly from microprocessor 12; furthermore, the chipset 14 doesn't decode neither the onboard address range nor PCI-E root port memory range for upstream requests. The upstream requests of peer-to-peer access are sent to microprocessor 12 by the port arbiter 141, then microprocessor 12 redirects the requests and issues the corresponding downstream cycles to the DARD logic 143, and then to the designated PCI-E port 16. As a result, the long peer-to-peer access path, PCI-E port 16→chipset 14→microprocessor 12 →chipset 14→another PCI-E port 16, will induce long access latency and thus make some isochronous applications, such as dual-engine graphic card, infeasible.

FIG. 2 is a block diagram of another prior computing system 20 employing PCI-Express architecture. The computing system 20 includes a microprocessor 22, a chipset 24 and a plurality of PCI-E ports 26. The chipset 24 includes a port arbiter 241, a DARD logic 243, a Upstream Onboard Range Decoding logic (UORD logic for short) 245 and a downstream arbiter 247. In the design, the computing system 20 uses the UORD logic 245 to distinguish the onboard access from the peer-to-peer access. The peer-to-peer access will be arbitrated to the downstream arbiter 247 and then sent to a specified device (of the specified PCI-E port 16) according to the decoding result of the device range of DARD logic 243.

The advantage of this design compared to the previous scheme shown on FIG. 1 is that the peer-to-peer access path is shortened. As shown on FIG. 2, the peer-to-peer access path is not routed through the microprocessor 22.

However, the peer-to-peer access scheme is mainly designed for legacy device, such as PCI 1 access PCI 2. Therefore, the data buffer size and access length are usually small and limited, which increase access latency and may not meet the requirements of some graphic applications, such as dual-engine graphic card that requires isochronous access.

Besides, two address decoding logics, upstream onboard range decoding logic 245 and downstream address range decoding logic 243, within the peer-to-peer access path will also worse the access latency.

SUMMARY OF THE INVENTION

In view of the foregoing drawbacks of the related prior arts, a more efficient computing system employing the PCI-E architecture is therefore needed.

One objective of the present invention is to solve the problem of long data access path length of peer-to-peer cycle in PCI-E architecture.

Another objective of the present invention is to solve the problem of data access latency of peer-to-peer cycle in PCI-E architecture.

The present computing system using PCI-E architecture includes at least one first PCI-E port, a first port arbiter, a first URD (Upstream Range Decoding) logic, a microprocessor, a DARD (Downstream Address Range Decoding) logic and a device arbiter.

The first port arbiter receives a data from the first PCI-E port. The first URD logic is coupled with the first port arbiter. The first URD logic comprises an onboard range table and a PCI-E device range table for detecting the data belonging to an onboard access or a peer-to-peer access. First of all, the microprocessor receives and processes the data from the first URD logic for said onboard access. Next, the DARD logic receives the data from the microprocessor. Then, the DARD logic decodes a device range of a downstream request of the data. Finally, the device arbiter along with the DARD logic and the first URD logic sends the data to one of the PCI-E port.

According to the present invention, the path length of the peer-to-peer cycle between PCI-E ports is shortened, and the data buffer size is enlarged. As a result, some isochronous applications such as dual-engine PCI-E graphic card is able to transfer the data more efficiently according to the present computing system.

These objectives of the present invention will undoubtedly become obvious to those of ordinary skill in the art after reading the following detailed description of the preferred embodiments which will be illustrated in the various figures and drawings.

BRIEF DESCRIPTION OF THE DRAWINGS

The present invention will now be explained with reference to the preferred embodiments illustrated in the following drawings.

DESCRIPTION OF THE PREFERRED EMBODIMENT

Figure 3:
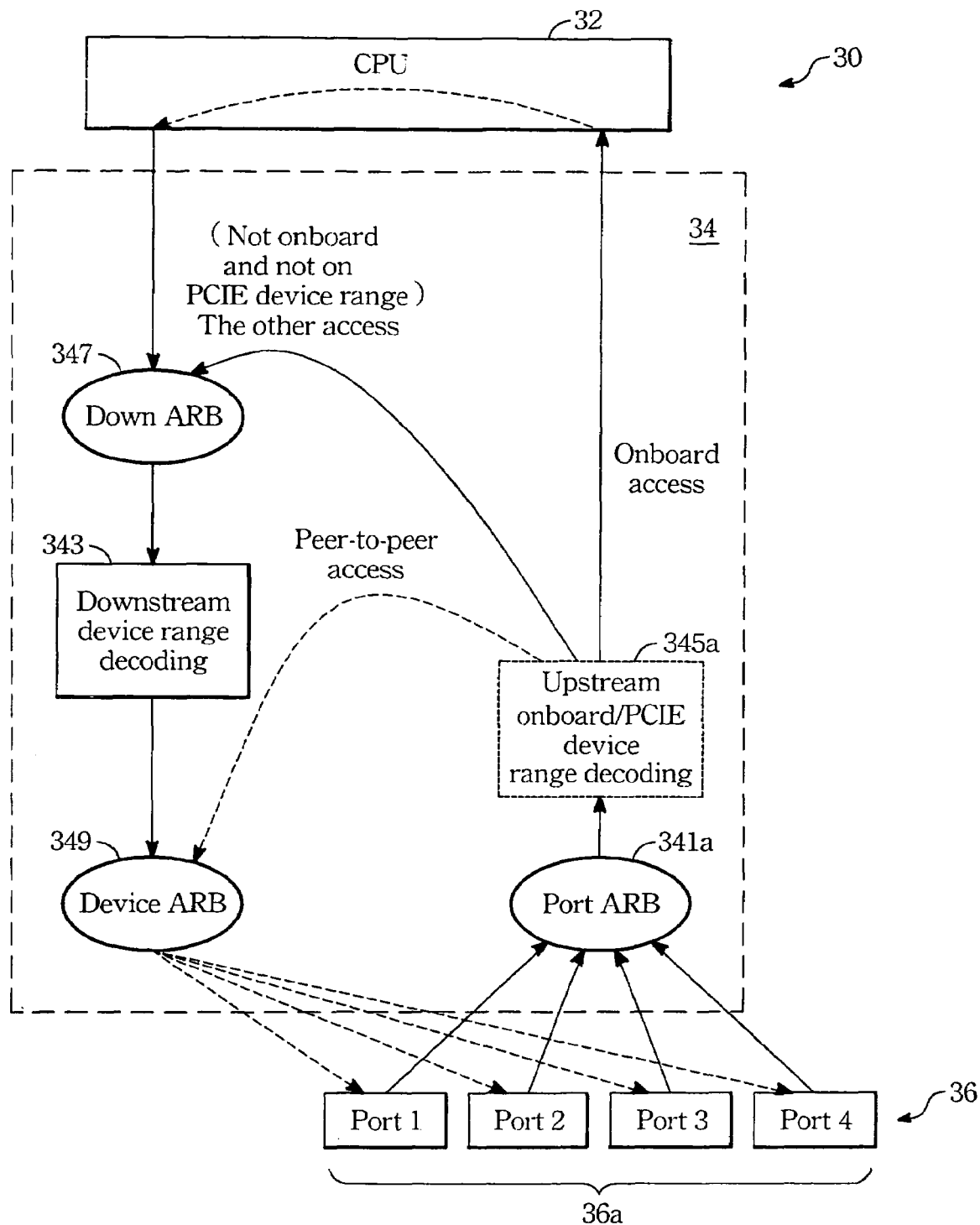
FIG. 3 is the block diagram of one embodiment of the present computing system.

Please refer to FIG. 3, which is the block diagram of one embodiment of the present computing system 30. The computing system 30 employs the peripheral component interconnection Express (PCI-E) architecture which includes at least one PCI-E port 36, a port arbiter 341, a URD (Upstream Range Decoding) logic 345, a microprocessor 32, a downstream arbiter 347, a DARD (Downstream Address Range Decoding) logic 343 and a device arbiter 349. The port arbiter 341, The first URD logic 345a, the downstream arbiter 347, the DARD logic 343 and the device arbiter 349 may belong to the chipset 34 of the computing system 30.

The PCI-E port 36 is the general purpose input/output (I/O) serial interconnections that provide a high performance interconnection for attached devices such as high performance graphics cards, universal serial bus (USB) ports, networking and other such devices.

The port-arbiter 341, receiving a data from PCI-E port 36, is a device that ensures that only one port arbiter 341 is allowed to initiate data transfer at a given moment. That is a common switching device.

The URD logic 345 is coupled with the port-arbiter 341 for detecting the data of an onboard access, a peer-to-peer access or the other access for subsequent dispatch. The URD logic 345 comprises an onboard range table and a PCI-E device range table for detecting the data of the onboard access or the peer-to-peer access. The upstream request of the data is decoded by the URD logic 341. If the decoded range hits the onboard range table, the data will be referred to the onboard access, in which the data is sent to the microprocessor 32. In the situation that the decoded range does not hit the onboard range table but hits the PCI-E device range table, the data is referred to the peer-to-peer access. In the peer-to-peer access situation, the data is directly sent to another PCI-E port 36, which is different from the original PCI-E port 26 from that the data comes through the device arbiter 349. The device arbiter 349 is coupled with both the DARD logic 343 and the URD logic 345.

As to the other access, on which the decoded range of the upstream request hits neither the onboard range table nor the PCI-E range table, the data is dispatched to the DARD logic 343 through the downstream arbiter 347. In other words, "the other access" in the present invention means the traditional peer-to-peer access.

The microprocessor 32 receives and processes the data from the URD logic 345 for the onboard access. The processed data will be arbitrated with following downstream cycle toward a device specified by the microprocessor 32. The DARD logic 343 receives the data from the microprocessor 32, wherein the DARD logic 343 decodes a device range of a downstream request of the data, so as to dispatch the data to the specified device.

In one embodiment of the present invention, the data received by the DARD logic 343 from the microprocessor 32 is routed through the downstream arbiter 347, which arbitrates the data of the onboard access (from the microprocessor 32) or the other access (from the URD logic 345).

To shorten the peer-to-peer access latency as much as possible, the device arbitration is executed before the downstream requests the specified PCI-E port 36. The device arbiter 349 receives the data from the DARD logic 343, which is the downstream cycle of the onboard access or the other access, or the data from the URD logic 345 of the peer-to-peer access, and dispatches the data to one of the plurality of PCI-E ports 36.

For some isochronous applications, such as dual-engine graphic card, predetermined data FIFO (first in first out) may be applied to the peer-to-peer access.

As the mentioned peer-to-peer access of the present invention (one of PCI-E ports 36→the port arbiter 341→the URD logic 345→the device arbiter 349→another of PCI-E ports 36), the present invention has provided a dedicated path for the PCI-E peer-to-peer cycle in order to improve the latency of prior arts.

Figure 1:
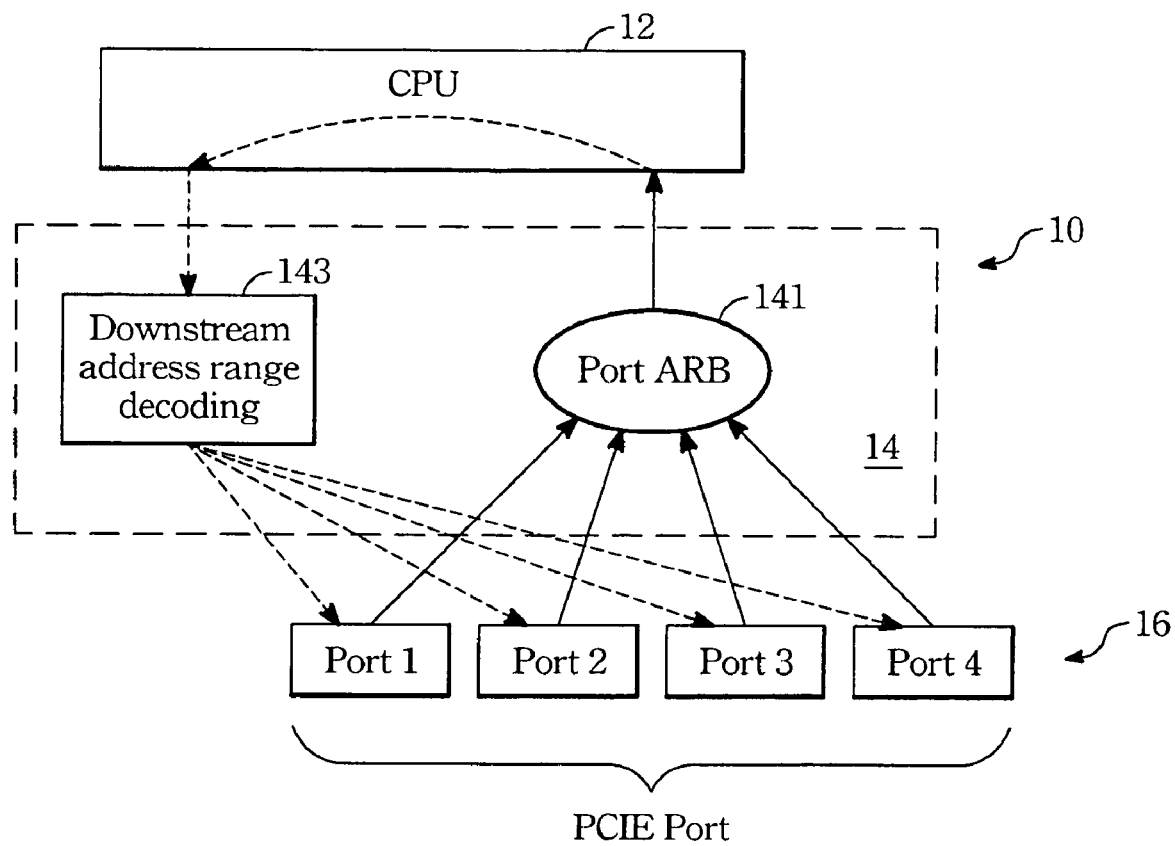
FIG. 1 is the block diagram of a prior computing system employing PCI-Express architecture.

In the prior art described with FIG. 1, the latency is caused by the prior peer-to-peer access passing through the microprocessor 12.

Figure 2:
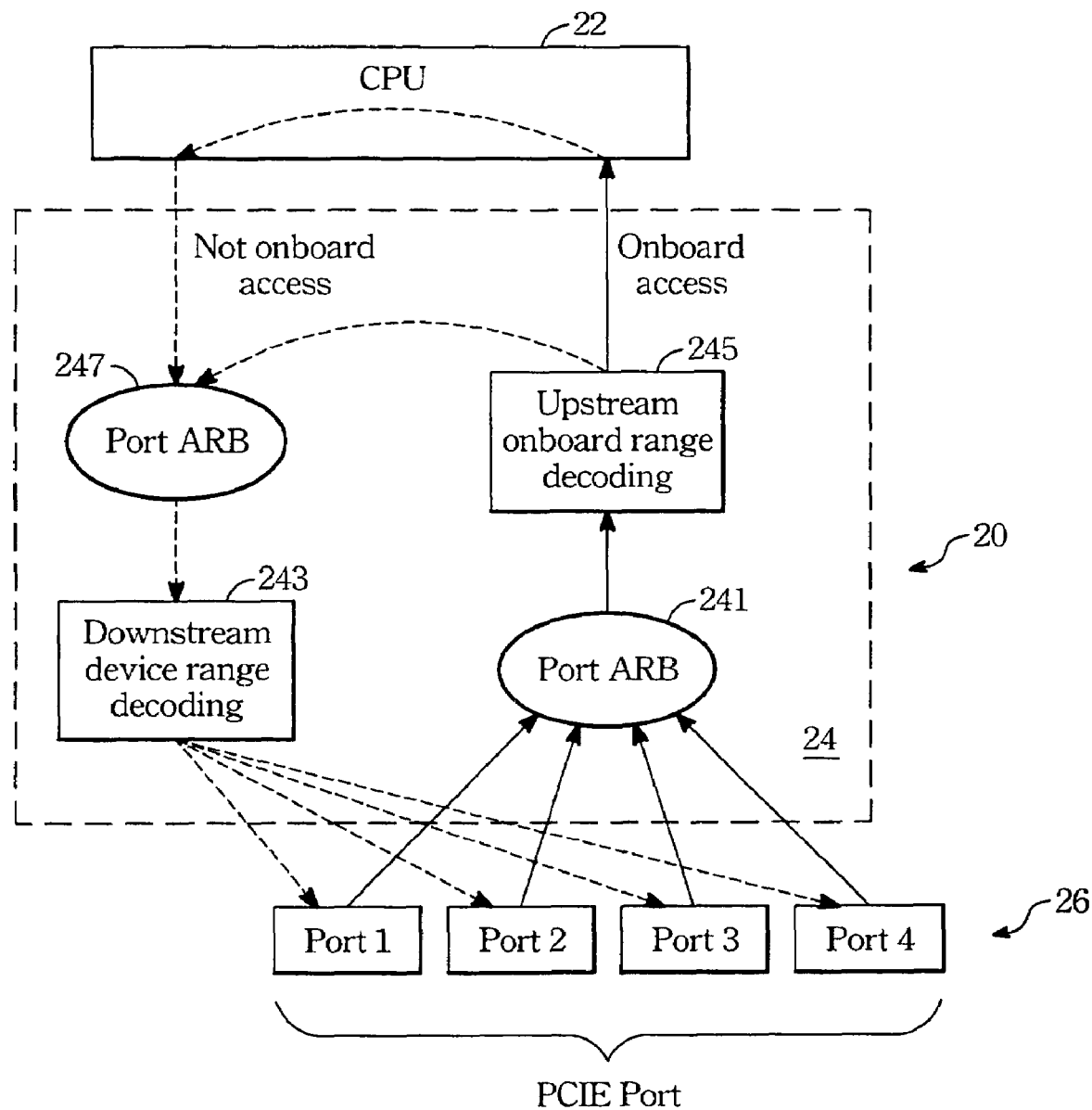
FIG. 2 is the block diagram of another prior computing system employing PCI-Express architecture.

In the prior art described with FIG. 2, the latency is caused by two address decoding logics, upstream onboard range decoding logic 245 and downstream address range decoding logic 243, within the prior peer-to-peer access path. Besides the long access length, the latency of the prior art of FIG. 2 is also caused by the small and limited data buffer size.

Obviously, in the present invention, the dedicated path for the peer-to-peer access provides a much shorter access length than prior arts. The data of the peer-to-peer access is distinguishable in the URD logic 345 and is dispatched to the designated PCI-E port 36 directly. Compared to the prior art of FIG. 1, the present peer-to-peer access has a shorter access length and does not pass through the microprocessor 32. Compared to the prior art of FIG. 2, the present peer-to-peer access only passes through one address decoding logic—the URD logic 345, and employs adequate FIFO size for isochronous applications. Hence, not only the access length is shortened in the present invention, but also the prior drawback of small and limited buffer size is improved.

Figure 4:
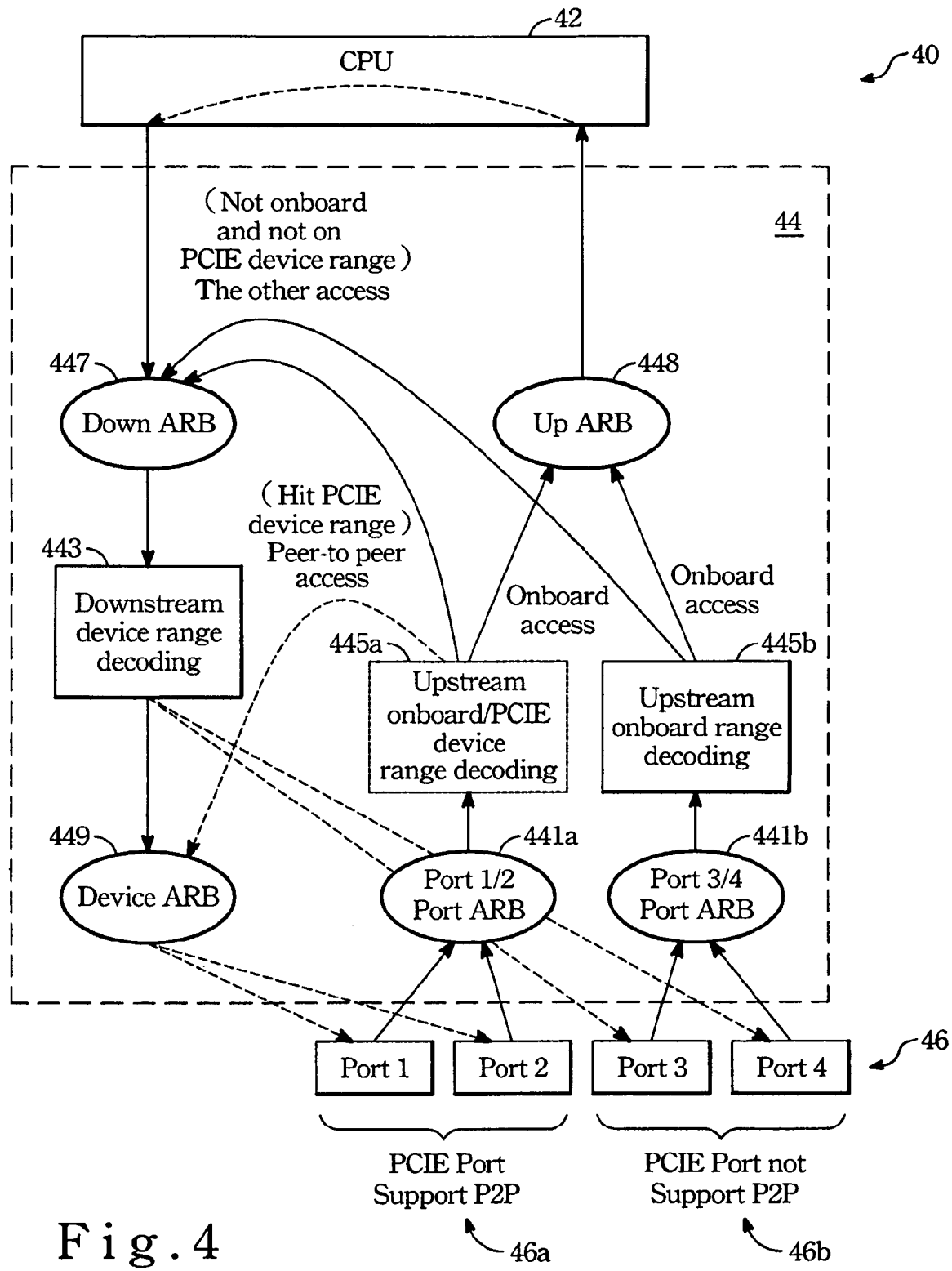
FIG. 4 is the block diagram of another embodiment of the present computing system.

Please refer to FIG. 4, which is a block diagram of another embodiment of the present computing system 40 and employs the peripheral component interconnection Express (PCI-E) architecture. The computing system 40 includes at least one first PCI-E port 46a, at least one second PCI-E port 46b, a first port arbiter 441a, a second port arbiter 441b, a first URD logic 445a, a second URD logic 445b, a upstream arbiter 448, a microprocessor 42, a downstream arbiter 447, a DARD logic 443 and a device arbiter 449. The first port arbiter 441a, the second port arbiter 441b, the first URD logic 445a, the second URD logic 445b, the upstream arbiter 448, the downstream arbiter 447, the DARD logic 443 and the device arbiter 449 may belong to the chipset 44 of the computing system 40.

As described previously in the embodiment on FIG. 3, the dedicated path for present peer-to-peer access may apply adequate FIFO size to isochronous applications. But in practice, not every first PCI-E port 46a needs this bandwidth and access speed. Considering to cost and efficiency, another embodiment as shown in FIG. 4 is provided. In this embodiment, the first PCI-E port 46a are designed for said "peer-to-peer access", "onboard access" and "the other access". The first PCI-E port 46a, the first port arbiter 441a and the first URD logic 445a have the same functions as the embodiment on FIG. 3. Hence, data transferred to the first PCI-E port 46a is able to be isochronous and is treated with highest priority. Therefore, the first PCI-E port 46a can meet the requirements of high speed devices such as dual-engine graphic card.

At least one second PCI-E port 46b, which is also the general purpose input/output (I/O) serial interconnections, are designed for said "onboard access" and "the other access" only. In other words, the second PCI-E port 46b is a interconnection for devices that need smaller buffer size or less speed.

The second port arbiter 441b, receiving a data from the second PCI-E port 46b, is a switching device for these second PCI-E port 46b. The second URD logic 445b is coupled with the second port-arbiter 441b for detecting the data of the onboard access or the other access for subsequent dispatch. The second URD logic 445b includes an onboard range table for detecting the data of the onboard access or the other access. The upstream request of the data from the second PCI-E port 46b is decoded by the second URD logic 445b. If the decoded range hits the onboard range table, the data will be referred to the onboard access, in which the data is dispatched to the microprocessor 42. If the decoded range does not hit the onboard range table, the data will be referred to the "the other access", in which the data is dispatched to the DARD logic 443 through the downstream arbiter 447. The DARD logic 443 is coupled with a plurality of second PCI-E ports 46b. The down stream cycle of said the other access from the second PCI-E ports 46b is routed toward the second PCI-E port 46b.

Because the data of the onboard access from the first PCI-E port 46a is also dispatched to the microprocessor 42, the upstream arbiter 448 is therefore needed. The upstream arbiter 448 coordinates the microprocessor 42, the first URD logic 441a and the second URD logic 441b for arbitrating the data to the microprocessor 42 to maintain data order as well.

In this embodiment, the computing system 40 has a dedicated path for the peer-to-peer access to the first PCI-E port 46a. The second PCI-E port 46b is a port without peer-to-peer support feature. In practice, the chipset 44 needs to separate the PCI-E port arbitrations to reduce the redundant address decoding logic and cycle dispatch logic. Therefore, the first port arbiter 441a and the second port arbiter 441b are separated; and the first URD logic 445a and the second URD logic 445b are also separated. In this architecture, devices that needs high data transfer speed, large bandwidth and buffer size are satisfied with the first PCI-E port 46a. The second PCI-E port 46b provide interconnections for other devices that have general PCI-E interface.

According to the present invention, the path length of the PCI-E port peer-to-peer cycle is shortened, and the data buffer size is enlarged. As a result, some isochronous applications such as dual-engine PCI-E graphic card are able to get more data transfer efficiency according to the present computing system 30 and 40. In dual-engine PCI-E graphic card, each graphic engine is responsible for calculating half or interleaved frame data and then transfers the calculated frame data through PCI-E peer-to-peer request. Such application can use the present first PCI-E ports to get sufficient data transfer efficiency and priority. The problems of access latency and long access length are both solved in the present invention.

While the present invention has been particularly shown and described with reference to the preferred embodiments, it can be easily understood by those skilled in the art that various changes on appearances or details may be made without departing from the spirit and scope of the present invention.

We claim:

1. A chipset supporting a peripheral component interconnection Express (PCI-E) architecture, connected in between a microprocessor and a plurality of PCI-E ports, comprising:
   a port arbiter, receiving data and arbitrating data priority from said PCI-E ports;
   a URD (upstream range decoding) logic, decoding the data from said port arbiter;
   a downstream arbiter, receiving the data and arbitrating data priority from said microprocessor and said URD logic;
   a DARD (downstream address range decoding) logic, decoding the data from said downstream arbiter; and
   a device arbiter, receiving the data and arbitrating data priority from said URD logic and said DARD logic and dispatching the data to a corresponding PCI-E port chosen from said PCI-E ports;
   wherein said URD logic dispatching data to said microprocessor if the data hit an on board range table, to said device arbiter if the data hit an PCI-E device range table, or to said downstream arbiter if the data hit neither said PCI-E device range table nor said onboard range table.

2. The chipset of claim 1, wherein if the data hit the on board range table, the data is regarded as an onboard access.

3. The chipset of claim 1, wherein if the data hit the PCI-E device range table, the data is regarded as a peer-to peer access.

4. A chipset supporting a peripheral component interconnection Express (PCI-E) architecture, wherein the chipset is connected among a microprocessor, a plurality of first PCI-E ports and a plurality of second PCI-E ports, the chipset comprising:
   a first port arbiter, receiving data and arbitrating data priority from said first PCI-E ports;
   a second port arbiter, receiving data and arbitrating data priority from said second PCI-E ports;
   a first URD (upstream range decoding) logic, decoding the data from said first port arbiter;
   a second URD (upstream range decoding) logic, decoding the data from said second port arbiter;
   an upstream arbiter, receiving the data and arbitrating data priority from said first URD logic and said second URD logic;
   a downstream arbiter, receiving the data and arbitrating data priority from said microprocessor, said first URD logic and said second URD logic;
   a DARD (downstream address range decoding) logic, decoding the data from said downstream arbiter and dispatching the data to a corresponding second PCI-E port chosen from said second PCI-E ports if the data come from one of said second PCI-E ports; and
   a device arbiter, receiving the data and arbitrating data priority from said first URD logic and said DARD logic and transmit the data to a corresponding first PCI-E port chosen from said first PCI-E ports;
   wherein said first URD logic dispatching data to said microprocessor if the data hit an on board range table, to said device arbiter if the data hit an PCI-E device range table, or to said downstream arbiter if the data hit neither said PCI-E device range table nor said onboard range table; and wherein said second URD logic dispatching data to said upstream arbiter if the data hit an on board range table, otherwise, to said downstream arbiter.

5. The chipset of claim 4, wherein if the data hit the on board range table, the data is regarded as an onboard access.

6. The chipset of claim 4, wherein if the data hit the PCI-E device range table, the data is regarded as a peer-to peer access.

7. A method of dispatching data from PCI-E ports, comprising:

dispatching data directly to a device arbiter while the data hits a PCI-E device range table;

dispatching data to a microprocessor and then to said device arbiter -while the data hits an onboard range table;

dispatching data to a downstream arbiter while the data hits neither the PCI-E device range table nor the onboard range table; and transmitting data to the correspondingly PCI-E port.

8. The method of claim 7, wherein after the data received by one of the PCI-E ports and before the step of dispatching data to said device arbiter, microprocessor, or downstream arbiter further comprising sorting and arbitrating priority of data.

9. The method of claim 7, wherein if the data hit the on board range table, the data is regarded as an onboard access.

10. The method of claim 7, wherein if the data hit the PCI-E device range table, the data is regarded as a peer-to peer access.

* * * * *